United States Patent
Madour et al.

(10) Patent No.: US 8,644,247 B2
(45) Date of Patent: Feb. 4, 2014

(54) INTER-SYSTEM HANDOFFS IN MULTI-ACCESS ENVIRONMENTS

(75) Inventors: Lila Madour, Kirkland (CA); Anders Lundstrom, Sollentuna (SE); Samy Touati, Rosemere (CA)

(73) Assignee: Telefonaktiebolaget L M Ericsson (Publ), Stockholm ( * ) Notice: Subject to any disclaimer, the term of this patent is extended or adjusted under 35 U.S.C. 154(b) by 1560 days.

(21) Appl. No.: 11/856,797

(22) Filed: Sep. 18, 2007

(65) Prior Publication Data

US 2008/0089293 A1  Apr. 17, 2008

Related U.S. Application Data

(60) Provisional application No. 60/851,080, filed on Oct. 12, 2006.

(51) Int. Cl.
*H04W 4/00* (2009.01)

(52) U.S. Cl.
USPC .............................. 370/331; 370/338; 370/349

(58) Field of Classification Search
USPC .................................. 370/328, 329, 331, 349
See application file for complete search history.

(56) References Cited

U.S. PATENT DOCUMENTS

| | | | |
|---|---|---|---|
| 6,671,507 B1 | 12/2003 | Vinck | |
| 7,191,226 B2 * | 3/2007 | Flykt et al. | 709/218 |
| 7,352,768 B2 * | 4/2008 | Lohtia et al. | 370/437 |
| 7,406,064 B2 * | 7/2008 | Morishige et al. | 370/331 |
| 7,512,110 B2 * | 3/2009 | Sayeedi et al. | 370/349 |
| 7,668,141 B2 * | 2/2010 | Sayeedi et al. | 370/331 |
| 7,697,489 B1 * | 4/2010 | Apte et al. | 370/338 |
| 7,917,152 B2 * | 3/2011 | Alarcon et al. | 455/456.1 |
| 8,219,097 B2 * | 7/2012 | Park et al. | 455/436 |
| 8,244,253 B2 * | 8/2012 | Choi et al. | 455/438 |
| 2003/0145091 A1 * | 7/2003 | Peng et al. | 709/229 |
| 2004/0137902 A1 | 7/2004 | Chaskar et al. | |
| 2006/0109817 A1 | 5/2006 | Ramanna et al. | |
| 2006/0198370 A1 * | 9/2006 | Haddad et al. | 370/389 |
| 2007/0019643 A1 * | 1/2007 | Shaheen | 370/389 |
| 2007/0189219 A1 * | 8/2007 | Navali et al. | 370/331 |
| 2008/0070578 A1 * | 3/2008 | Flore et al. | 455/438 |
| 2008/0080480 A1 * | 4/2008 | Buckley et al. | 370/352 |

FOREIGN PATENT DOCUMENTS

| | | |
|---|---|---|
| EP | 1513365 A2 | 3/2005 |
| EP | 1560378 A2 | 8/2005 |

OTHER PUBLICATIONS

Hesham Soliman, Mobile IPv6 Support for Dual Stack Hosts and Routers (DSMIPv6), MIP6 Working Group, Internet-draft, Oct. 2006.
R. Samarasinghe et al., Analysis of Intersystem Handover: UMTS FDD & WLAN, London Communications Symposium: University College London, Sep. 8-9, 2003.
PCT Search Report from corresponding application PCT/IB2007/054146.
3GPP TR 23.882 V.1.4.0, 3rd Generation Partnership Project; Technical Specification Group Services and System Aspects; 3GPP System Architecture Evolution: Report on Technical Options and Conclusions (Release7), Sep. 2006.

* cited by examiner

*Primary Examiner* — Brian O'Connor
(74) *Attorney, Agent, or Firm* — Murphy, Bilak & Homiller, PLLC

(57) ABSTRACT

Systems and methods according to these exemplary embodiments provide for handing off user equipment between different access networks, e.g., a high rate packet data (HRPD) system and a long term evolution (LTE) system. An existing mobile IP session can be maintained by the UE during the handoff.

10 Claims, 9 Drawing Sheets

INTER-SYSTEM HANDOFFS IN MULTI-ACCESS ENVIRONMENTS

RELATED APPLICATION

This application is related to U.S. patent application Ser. No. 11/856,837, also entitled "Inter-System Handoffs In Multi-Access Environments", to, Anders Lundstrom and Lila Madour, filed on the same day as the present application, the disclosure of which is incorporated here by reference. This application is related to, and claims priority from, U.S. Provisional Patent Application Ser. No. 60/851,080, entitled "Optimized handover in a multi-access environment", filed on Oct. 12, 2006, the disclosure of which is incorporated here by reference.

TECHNICAL FIELD

The present invention relates generally to telecommunications systems, and in particular to methods and systems for performing inter-system handoffs.

BACKGROUND

Radiocommunication networks were originally developed primarily to provide voice services over circuit-switched networks. The introduction of packet-switched in, for example, the so-called 2.5G and 3G networks enabled network operators to provide data services as well as voice services. Eventually, network architecture will evolve toward all-IP networks which provide both voice and data services. However, network operators have a substantial investment in existing infrastructure and would, therefore, typically prefer to migrate gradually to all-IP network architectures to allow them to extract sufficient value from their investment in existing infrastructures. In order to provide the capabilities needed to support next generation radiocommunication applications, while at the same time using legacy infrastructure, network operators will deploy hybrid networks wherein a next generation radiocommunication system is overlaid onto an existing circuit-switched or packet-switched network as a first step in the transition to an all IP-based network.

One example of such a hybrid network involves an existing 3GPP2 radiocommunication system, such as a high rate packet data (HRPD) system, onto which a next generation "long term evolution" (LTE) system is overlaid. As will be appreciated by those skilled in the art, HRPD systems are sometimes referred to by many different names or acronyms. For example, HRPD systems have sometimes been referred to as "high rate data" (HRD) systems or by reference to their air interface standard promulgated by TIA-EIA, i.e., IS-856. The IS-856 standard, entitled "cdma2000® High Rate Packet Data Air Interface Specification (2000)", which is available online at www.tiaonline.org, is incorporated here by reference. Additionally, since HRPD systems use a code division multiple access (CDMA) scheme and evolved from CDMA 2000, they are also sometimes referred to as "1× EV-DO" systems which refers to an "EVolution, Data-Only" version of CDMA 2000. Similarly, LTE systems refer to, for example, next generation (4G) wideband CDMA (WCDMA) systems which are intended to provide improved performance. Although not yet standardized, LTE systems will ultimately be designed in accordance with a new version of the UMTS standards, see, e.g., 3GPP TR 25.913 available online at www.3gpp.org. Target performance goals for LTE systems currently include, for example, support for 200 active calls per 5 MHz cell and sub 5 mS latency for small IP packets.

When an LTE system is overlaid onto an HRPD system, various types of inter-system interoperability will become desirable, one of which is handoff or handover. Inter-system handoff refers to, for example, the process whereby a mobile unit, e.g., a cellular telephone, wireless PDA or laptop, which is currently being supported by a first radiocommunication system is transferred to the support of a second radiocommunication system. In the context of this application, as shown conceptually in FIG. 1, an inter-system handoff of interest involves the transfer of communication support of mobile unit 10 from an HRPD access network 20 to an LTE access network 30 or vice versa. Such handoffs may be performed for a variety of reasons. For example, a mobile unit 10 which is currently being served by the HRPD access network 20 may have moved into a geographic area wherein it can be better served by the LTE access network 30. Alternatively, the inter-system handoff may be performed to provide load balancing between the HRPD access network 20 and the LTE access network 30.

Regardless of the particular reason for the handoff, various signaling needs to be performed in order to complete the transfer of support responsibility for the mobile unit 10 from or to the LTE access network 30. Additionally, unless the mobile unit 10 can simultaneously receive signals from both the HRPD access network 20 and the LTE access network 30, the inter-system handoff will be a hard ("break before make") handoff rather than a soft ("make before break") handoff. For hard handoffs it is further desirable to minimize the intervening time interval during which the mobile station 10 is not connected to either the HRPD access network 20 or the LTE access network 30. Accordingly the exemplary embodiments described herein address the need for mechanisms to facilitate such inter-system handoffs.

SUMMARY

According to one exemplary embodiment, a method for handing over a communication connection from a first radio access network to a second radio access network includes the steps of establishing, by a user equipment, a first radio connection with the first radio access network and a mobile IP session associated with a prefix, requesting, by the user equipment, a bearer on the second radio access network, establishing, by the user equipment, a second radio connection with the second radio access network, and receiving, at the user equipment, a router advertisement message which includes the prefix, wherein the mobile IP session is maintained during the transition from the first radio connection to the second radio connection.

According to another exemplary embodiment, a mobile station includes: a transceiver for establishing radio connections via either a first radio access network air interface or a second radio access network air interface, and a processor for establishing, via the transceiver, a first radio connection with the first radio access network and a mobile IP session associated with a prefix, and subsequently requesting, via the transceiver, a bearer on the second radio access network, wherein, after a second radio connection with the second radio access network is established, the transceiver receives a router advertisement message which includes the prefix, wherein the mobile IP session is maintained during the transition from the first radio connection to the second radio connection.

According to yet another exemplary embodiment, a method for handing over a communication connection from a first radio access network to a second radio access network includes the steps of: receiving a connection setup request to establish a connection between a first radio access network and a user equipment (UE), determining that the UE was being handed over from a second radio access network, and transmitting a router advertisement message toward the UE which includes a same prefix associated with a mobile IP connection that is being maintained with the UE during the handover.

According to still another exemplary embodiment, a gateway node for supporting multiple radio access networks includes a processor for receiving a connection setup request to establish a connection between a first radio access network and a user equipment (UE) and determining that the UE was being handed over from a second radio access network to which it was connected via the gateway node, wherein the processor transmits a router advertisement message toward the UE which includes a same prefix associated with a mobile IP connection that is being maintained with the UE during the handover.

BRIEF DESCRIPTION OF THE DRAWINGS

The accompanying drawings illustrate exemplary embodiments of the present invention, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
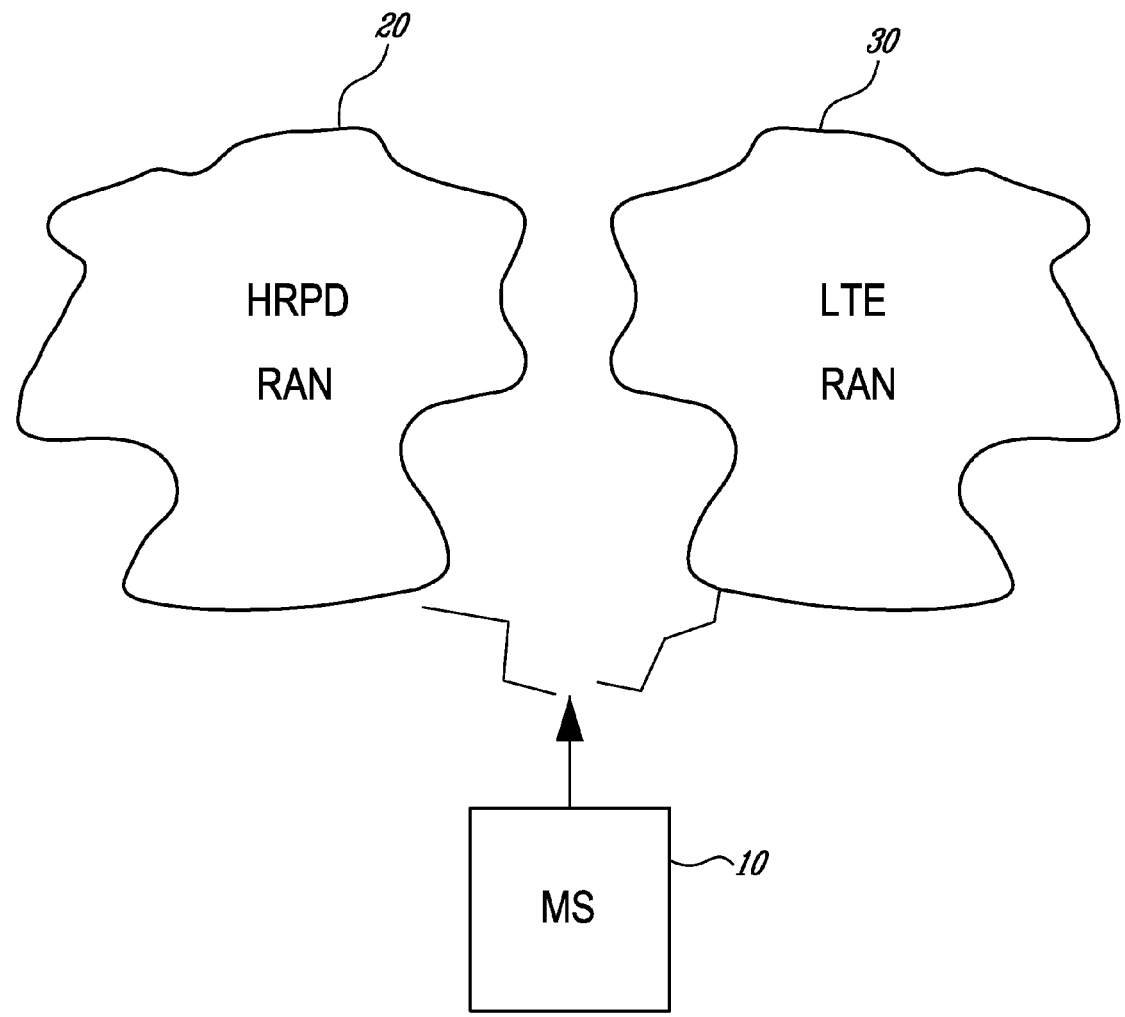
FIG. 1 illustrates handoff of a mobile station between a high rate packet data (HRPD) radio access network (RAN) and a long term evolution (LTE) RAN.
Figure 2:
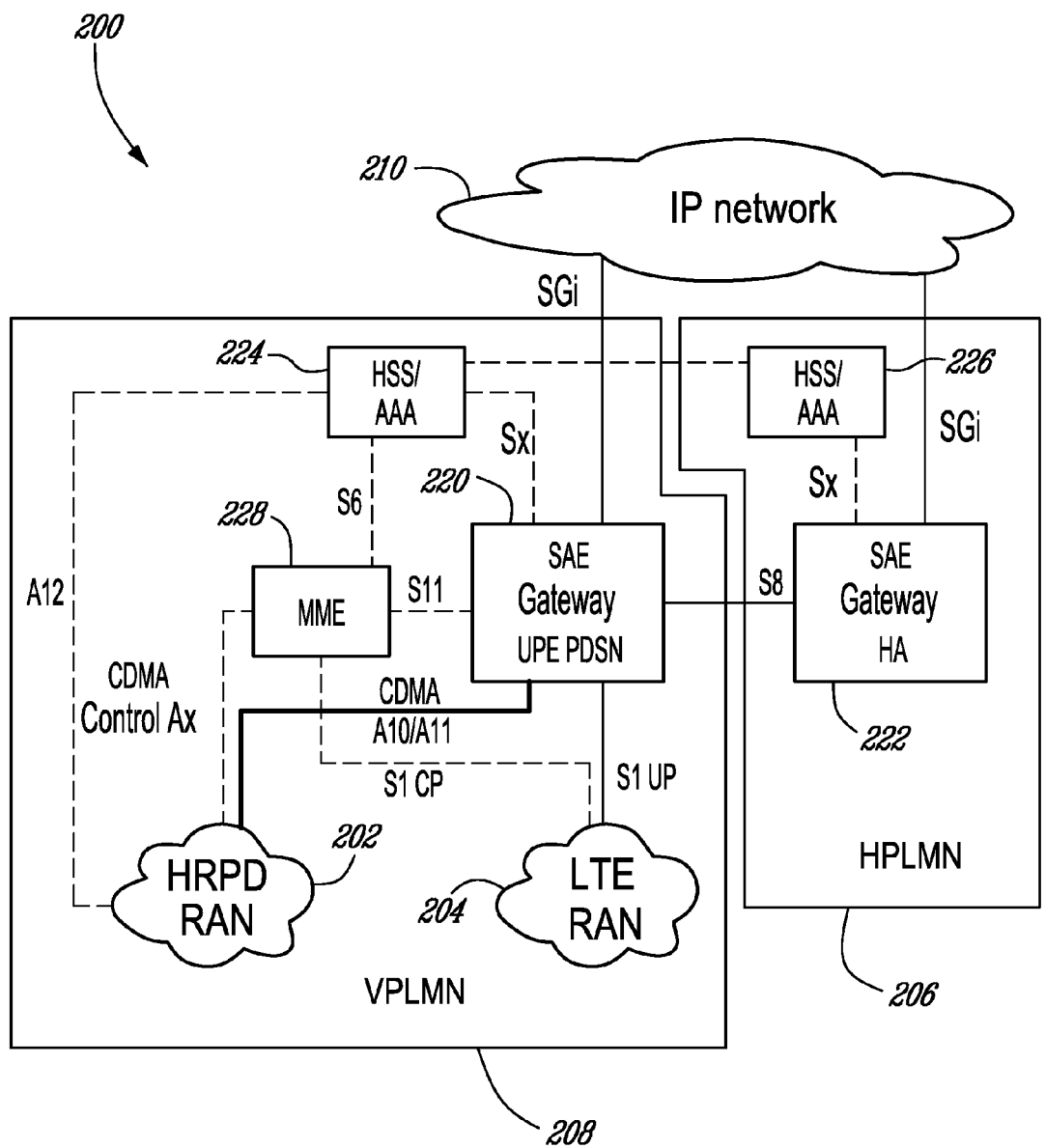
FIG. 2(a) illustrates a hybrid radio access network using an IP Multimedia System (IMS) architecture according to an exemplary embodiment.
FIG. 2(b) illustrates the exemplary hybrid radio access network of FIG. 2(a) in more detail.
Figure 2:
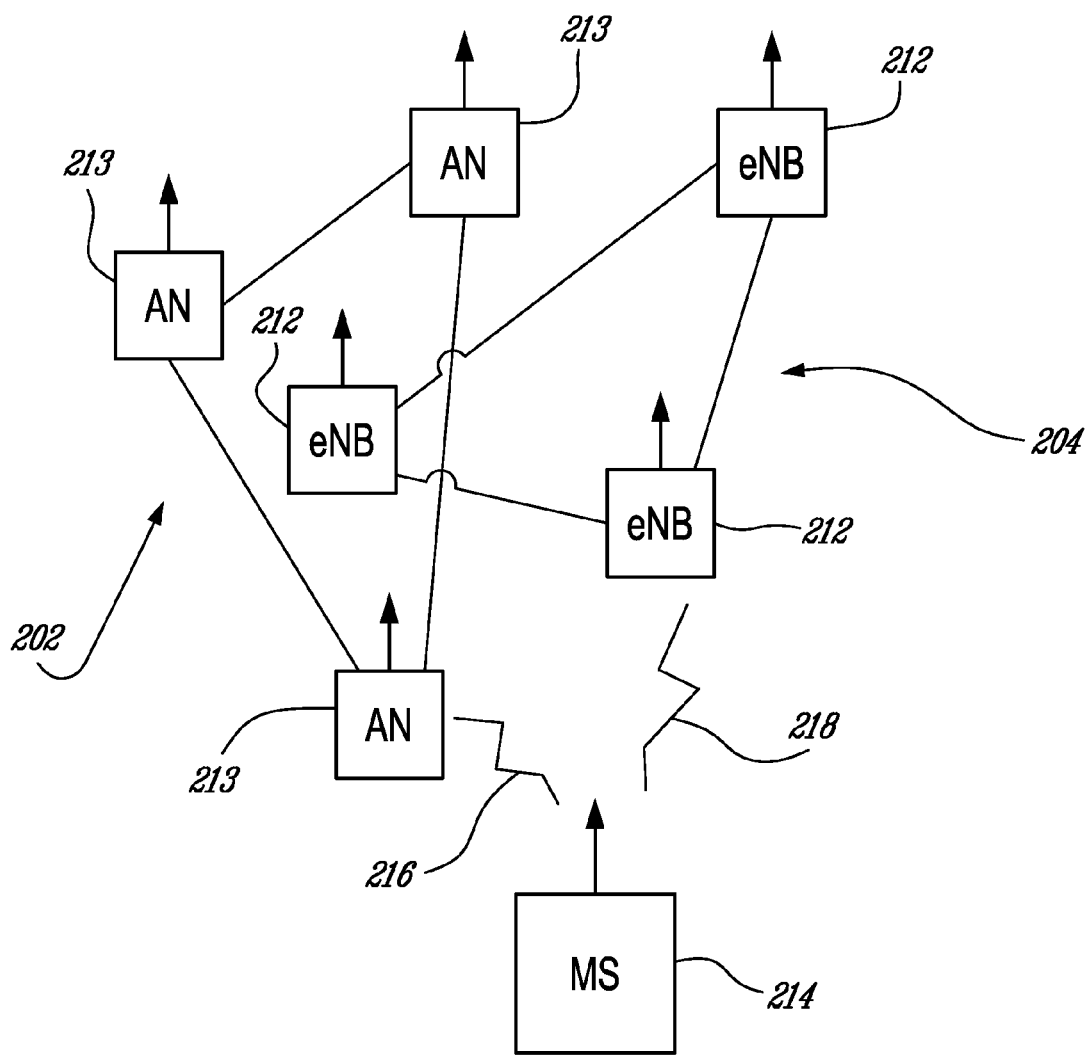

As mentioned above, it is desirable to provide mechanisms and methods for handing off connections between an HRPD access network and an LTE access network, albeit the present invention is not limited thereto as will be described below. Nonetheless, to provide some exemplary context for this discussion, a hybrid system 200 which includes both an HRPD (3GPP2) access network 202 and an LTE access network 204 is provided as FIGS. 2(a) and 2(b) and will now be described. For generality, and to facilitate the handoff discussions below, the hybrid system 200 includes both a home public land mobile network (HPLMN) 206 and a visited public land mobile network (VPLMN) 208, as well as various IP networks 210 (e.g., including the Internet) to which the radio networks are connected. Each access network 202 and 204 will include a number of base stations 213 and 212, respectively, as seen in FIG. 2(b) for providing radio access to mobile station 214 via air interfaces 216 and 218, respectively, which are individually specified for the respective access networks. More specifically, the air interface 216 is specified by the above-incorporated by reference IS-856 standard and the as yet to be standardized air interface 218 is expected to include, for example, an orthogonal frequency division multiple access (OFDMA) downlink and a single carrier frequency division multiple access (SC-FDMA) uplink. Notationally, HRPD base stations 206 are typically referred to as "access nodes" (ANs), while LTE base stations 206 are typically referred to as "evolved Node B's" (eNBs). The radio access networks 202 and 204 may, in addition to base stations 206, include other functional entities such as packet control functions (PCFs) which are not shown in FIGS. 2(a) and 2(b) to simplify the illustration.

Returning to FIG. 2(a), the elements of both the HRPD access network 202 and the LTE access network 204 are, according to this exemplary embodiment, connected to an integrated system architecture evolution (SAE) gateway (GW)-user plane entity (UPE)/PDSN 220. The PDSN aspect of element 220 refers to the HRPD element which interconnects the IP networks 210 with the radio access network 202 via an A10/A11 interface or reference point, as well as providing interconnectivity to other PDSNs (not shown) in the HRPD portion of the hybrid system 200. The A interfaces/reference points associated with the HRPD portion of the hybrid network 200 and shown in FIG. 2(a) are specified in, for example, TIA-878-A (A.S0008) and TIA-1878-A (A.S0009), available at www.tiaonline.org, the disclosures of which are incorporated here by reference.

Similarly, the SAE gateway-UPE aspect of element 220 refers to the LTE element which interconnects the IP networks 210 with the radio access network 204 via S1 and SGi interfaces, as well as providing interconnectivity to other SAE GWs in the LTE portion of the hybrid system 200, e.g., the home gateway 222. The S interfaces/reference points associated with the LTE portion of the hybrid network 200 and shown in FIG. 2(a) are specified in, for example, the standards document 3GPP TS 23-402. Additionally, SAE GW UPE/PDSN 220 and SAE GW 223 are connected to integrated home subscriber services (HSS)/authentication, authorization and accounting (AAA) servers 224 and 226, respectively, which are repositories that store data associated with subscribers and use that data to provide various services, some of which will be described below in the context of handoff. As will be described below, integrating the SAE GW portion of element 220 with the PDSN portion of element 220 can be beneficial with respect to optimizing Layer 3 handoff signaling.

The mobility management entity (MME) 228 is an LTE system entity which manages the distribution of paging messages to the eNBs 212 and which is also involved in handoff signaling according to exemplary embodiments as described below. Moreover, in addition to the S1, S6 and S11 interfaces which interconnect the MME 228 with the LTE RAN 204, HSS/AAA 224 and SAE GW-UPE/PDSN 220, respectively, another interface/reference point has been added between the MME 228 and the HRPD RAN 202. This new interface, referred to as the "Ax" interface, is used as described in the above-incorporated by reference patent application to facilitate Layer 2 signaling for handoffs of a mobile station 214 between the HRPD RAN 202 and the LTE RAN 204. It will be appreciated that the exemplary hybrid system architecture illustrated in FIGS. 2(a) and 2(b) is purely illustrative and that the following exemplary embodiments can be implemented in other architectures.

According to these exemplary embodiments, Layer 3 handoff signaling is arranged so as to permit a UE 214 operating in the HRPD RAN 202 to move to the LTE RAN 204 without requiring the UE 214 to perform a binding update (BU) to the home agent (HA) 222 (i.e., which would otherwise be needed to update the mobility bindings and Internet Key Exchange (IKE) Security Associations (SA) associated with the UE 214. This reduces the time associated with performing the inter-system handoff and can be accomplished as follows according to an exemplary embodiment illustrated in FIG. 3.

Therein, according to an exemplary embodiment, an intra-gateway handoff (which can also be viewed as a re-origination) of mobile unit 214 can be performed from the HRPD RAN 202 to the LTE RAN 204. Prior to performing the Layer 3 handoff signaling, a point-to-point protocol (PPP) connection 300 will exist between the UE 214 and the integrated PDSN-SAE GW 220 for transferring IP packets as part of the overall HRPD connection. Likewise a mobile IPv6 (MIPv6) connection will exist between the UE 214 and the HA 222. As will be appreciated by those skilled in the art, the MIPv6 connection enables the UE 214 to move within the hybrid system 200 while maintaining reachability and ongoing sessions using an IPv6 home address (also known as a "prefix"). So-called dual stacked (DS) MIPv6 supports the use of both IPv4 and IPv6 addresses without requiring two mobility management protocols and the connection 302 can, for example, be implemented as a DS-MIPv6 connection. For more information on DS-MIPv6, the interested reader is referred to the corresponding standards document entitled "Mobile IPv6 support for dual stack Hosts and Routers (DSMIPv6)", edited by Hesham Soliman, 8 Mar. 2007, <draft-ietf-mip6-nemo-v4traversal-04.txt>, which can be found online at http://www1.ietf.org/ID.html, the disclosure of which is incorporated here by reference.

Figure 3:
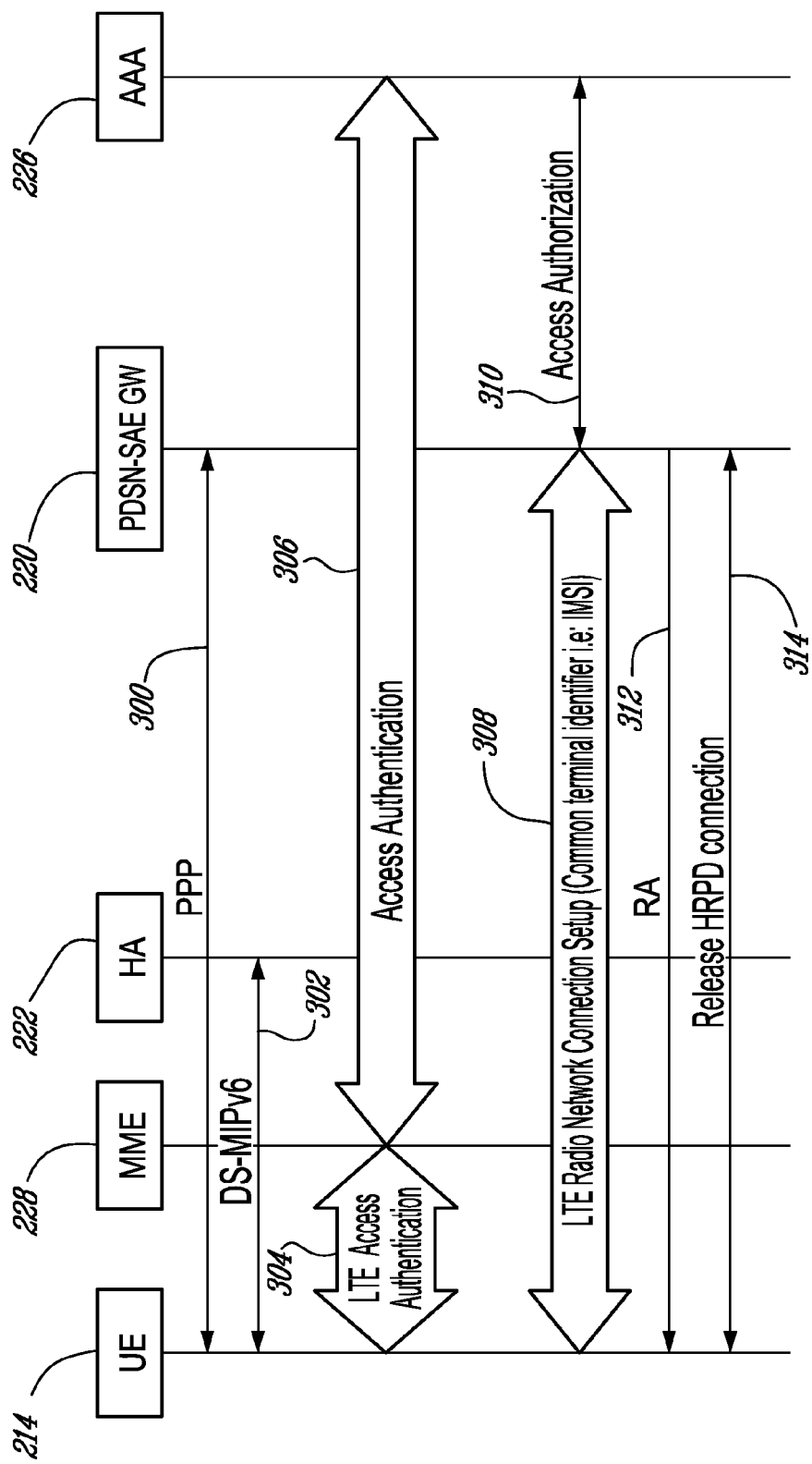
FIG. 3 illustrates Layer 3 signaling associated with a handoff of a user equipment (UE) from an HRPD RAN to an LTE RAN according to an exemplary embodiment.

With the pre-existing PPP 300 and DS-MIPv6 302 connections in place and a Layer 2 (link layer) having been established, e.g., as described in the above-identified patent application, the UE 214 can initiate Layer 3 signaling for the handoff as shown beginning at LTE Access/Authentication signaling 304 in FIG. 3 wherein the UE 214 requests a handoff to the LTE RAN 204 by signaling the MME 228 to establish a bearer in the LTE RAN 204. Authentication of the UE 214 is then performed by signaling 306 between the MME 2218 and AAA 226. In order to avoid sending the binding update/acknowledgement Layer 3 signaling to the HA (as well as MIPv6 re-registration) according to these exemplary embodiments, the target eNB 212 should connect to the LTE portion of the hybrid system 200 via the same node, i.e., the same PDSN-GW SAE 220 as that which was initially used for the HRPD connection. To enable this functionality, exemplary embodiments provide for a terminal (UE) identifier which is common for both the HRPD RAN 202 and the LTE RAN 204, i.e., the UE 214 will identify itself using the same terminal identifier regardless of which of these two networks it is trying to access as well as using the same terminal identifier when it is being handed off between the two portions of the hybrid network 200.

Figure 4:
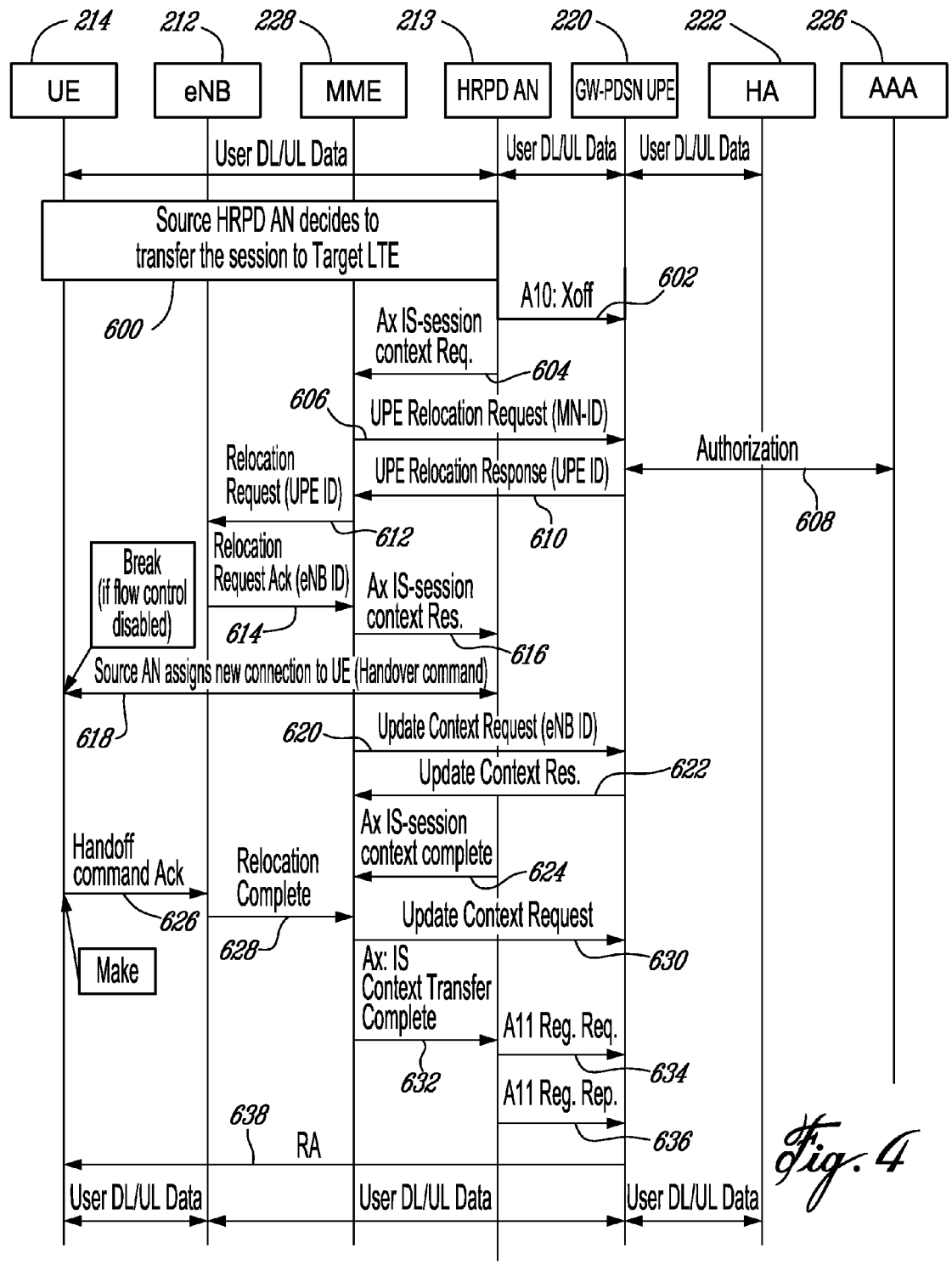
FIG. 4 illustrates Layer 2 signaling associated with a handoff of a UE from from an HRPD RAN to an LTE RAN according to another exemplary embodiment.

The common terminal identifier according to these exemplary embodiments may be implemented or formatted in different ways. For example, existing identifier types may be used, e.g., an International Mobile Subscriber Identity (IMSI) or Mobile Node Identification (MN-ID), or a new common terminal identifier can be created as long as it is used in both systems. Having a common terminal identifier enables the radio access networks to retrieve the IP address of the PDSN-SAE GW 220 which was used to support the originating HRPD connection and to use that gateway's IP address to establish the target connection in the LTE RAN 204. The retrieval of the gateway's IP address can be performed as part of the Layer 2 signaling, an example of which is provided in FIG. 4.

Therein, at step 600, the source HRPD AN 213 decides to perform an inter-system handoff (which could also be seen in this context as a re-origination into the other radio access network). As shown by signal 602, the HRPD AN 213 may optionally request the GW-PDSN UPE 220 to stop data transmission if flow control is enabled. It will be appreciated that if this latter feature is used, then the break-to-make time will be increased, since the UE 214 cannot transmit data until it has been successfully handed off to LTE portion of the hybrid system 200. If, on the other hand, this feature is deactivated and message 602 is not sent, then the UE 214 can continue to transmit data over the HRPD portion of the hybrid system 200 until a handoff command is received at step 618, therefore reducing the break-to-make time.

Regardless of whether the flow control message 602 is sent or not, the handoff process will continue with the HRPD AN 213 sending an Ax IS-session context request message 604 to the MME 228 to initiate the handoff. This aspect of the Layer 2 signaling is described in more detail in the above-incorporated by reference patent application. Messages 604-614 illustrate the procedures used to perform the relocation in the target LTE system 204 according to this exemplary Layer 2 signalling. Of particular interest for the present application are messages 606, 610 and 612 which are used to retrieve the gateway 220's IP address. The UPE Relocation Request 606 includes, for example, the common terminal identifier (e.g., MN-ID) as well as other information elements described in the aforementioned patent application. In response thereto, the gateway's IP address (referred to in FIG. 4 as the user plane entity (UPE) ID) is forwarded back to the radio access network (e.g., eNB 213) via MME 228. The reader interested in other details associated with establishing a Layer 2 connection for the handoff and the other messages shown in FIG. 4 which are not described here for clarity of the discussion are referred to the above-identified, incorporated by reference patent application.

Returning to FIG. 3, the availability of the same gateway 220's IP address in the LTE RAN enables the transmission of the common terminal identifier from the UE 214 to the same PDSN-SAE GW 220 that handled the terminal's HRPD connection as part of the Layer 3 LTE radio network connection setup message 308. Upon receipt of this message 308, the PDSN-SAE GW 220 uses the common terminal identifier to determine that the message 308 actually involves a handoff from the HRPD RAN 202 to the LTE 204 instead of the establishment of a "completely" new connection, e.g., associated with a power-on of a UE. This can be accomplished by, for example, comparing the common terminal identifier received in message 308 with a list of terminal identifier's stored in a memory associated with PDSN-SAE GW 220 associated with ongoing connections. In this case, since the UE 214 is connected to the HRPD RAN 202 via the same gateway 220, there will be a match indicating that a handoff is occurring.

The PDSN-SAE GW 220 will, in response to the connection setup message 308, retrieve the home prefix associated with the UE 214 from the AAA server 226. In addition, after the PDSN-SAE GW 220 has determined that the message 308 is associated with a handoff, it will then send a router advertisement (RA) message 312 with the same prefix as was previously used by the UE 214 in its MIPv6 session. This has the effect of maintaining that session during the transition between radio access networks which, in turn, reduces the overall time associated with the handoff since a new MIPv6 session does not need to be established. Additionally, it will be noted in FIG. 3 that no binding updates or mobility re-registration messages are shown because handoffs according to these exemplary embodiments can be performed without such signaling. After the RA message 312 is received by the UE 214, the HRPD connection can be released as indicated by signaling 314.

Figure 5:
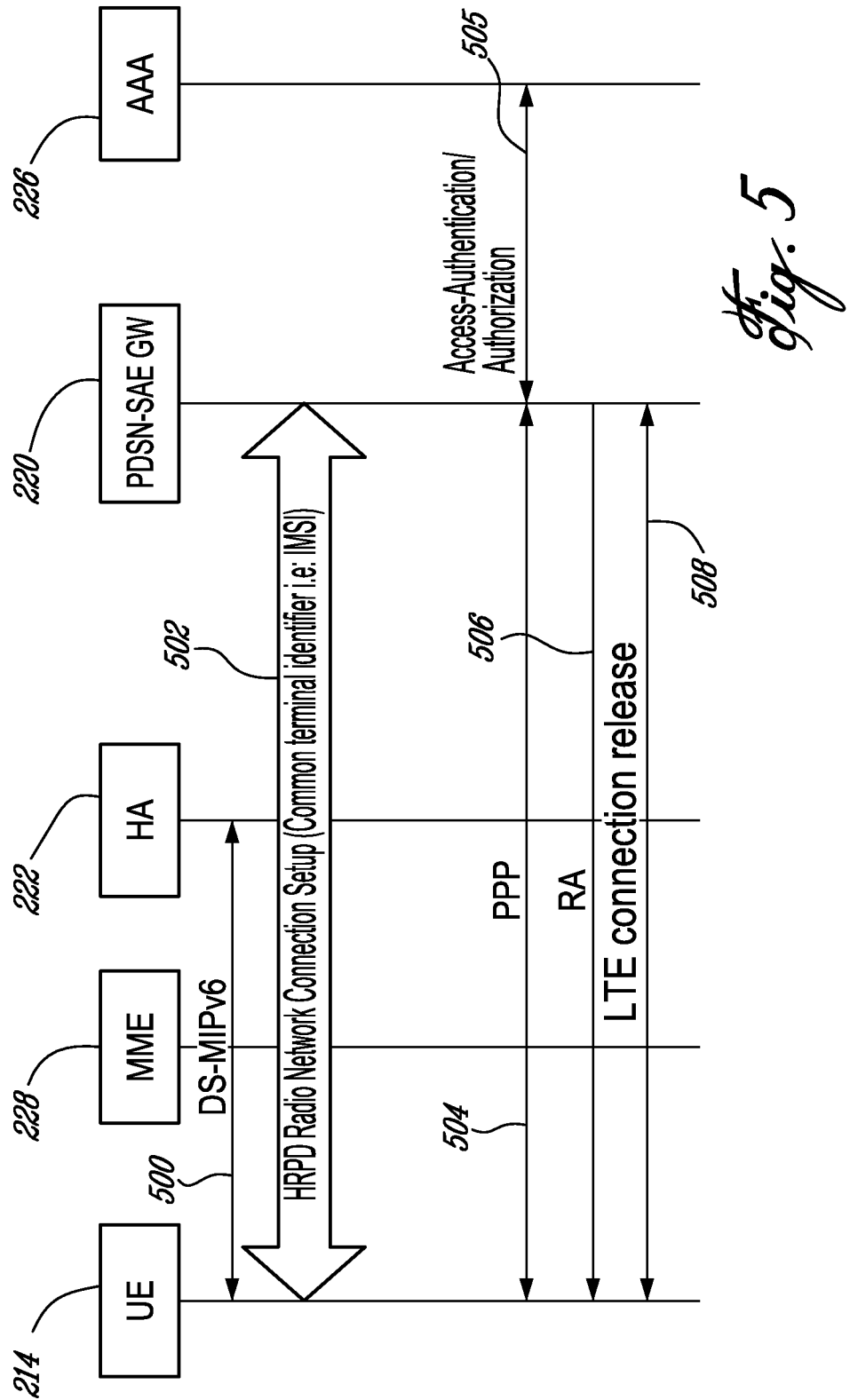
FIG. 5 illustrates signaling associated with a handoff of a UE from an LTE RAN to an HRPD RAN according to yet another exemplary embodiment.

The foregoing exemplary embodiment describes a handoff or access network re-origination in the HRPD to LTE direction. However other exemplary embodiments contemplate such handoffs or access network re-originations in the reverse direction, an example of which is provided as FIG. 5. Therein, a UE 214 initially has a radio connection with the LTE RAN 204 and an existing DS-MIPv6 connection 500 with the HA 222. As described above, the IP address of the same PDSN-SAE GW 220 is retrieved and provided to the HRPD RAN 202. Via signaling 502, the UE 214 establishes an HRPD radio connection via an appropriate eNB 212 by sending a connection setup message 502 including a common terminal identifier, e.g., IMSI, to the PDSN-SAE GW 220. As in the previous exemplary embodiment, the PDSN-SAE GW 220 uses the common terminal identifier to determine that the connection setup request 502 is, in fact, a handoff from an LTE connection to an HRPD connection. This, in turn, causes the PDSN-SAE GW 220 to send a routing advertisement (RA) message 506 to the UE 214 (following a successful PPP connection setup via signaling 504 and access-authentication/authorization confirmation 505). As in the previous exemplary embodiment, the RA message 506 contains the same prefix as that used for the HRPD connection enabling the DS-MIPv6 connection 500 to be maintained during the transition of the UE 214 from the LTE RAN 204 to the HRPD RAN 202.

Figure 6A:
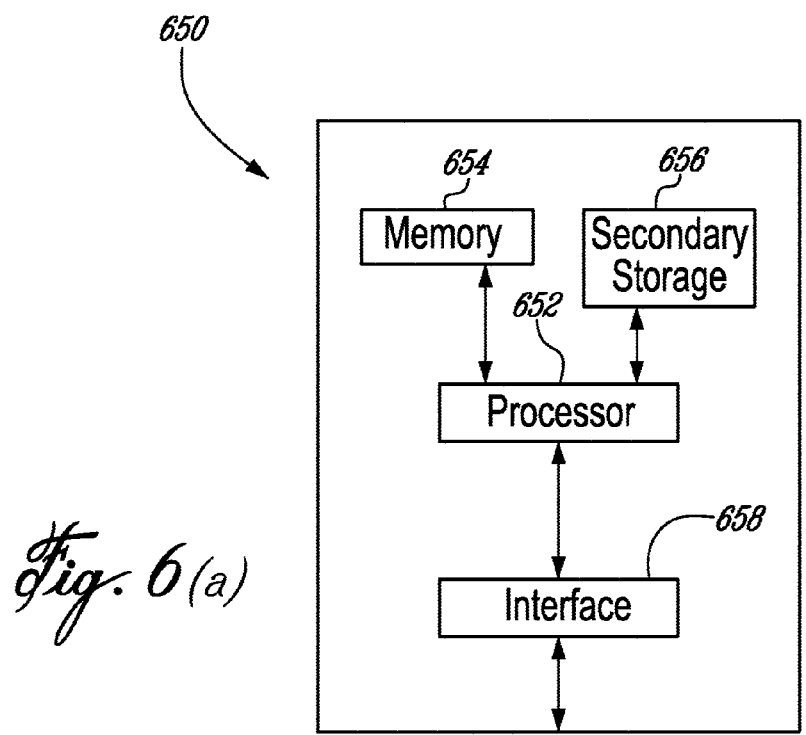
FIG. 6(a) illustrates a communication node or server according to an exemplary embodiment.
Figure 6B:
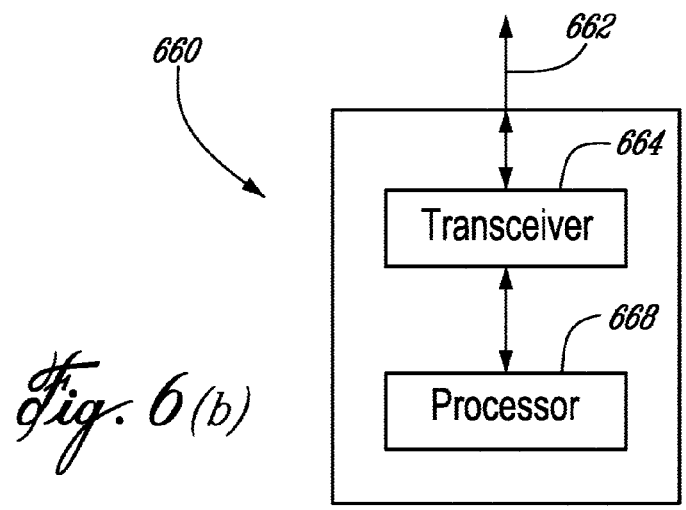
FIG. 6(b) illustrates a mobile station or user equipment according to an exemplary embodiment.

The foregoing exemplary embodiments describe Layer 3 signaling associated with handoffs between HRPD and LTE systems. Various communication nodes are described as being involved in the signaling. These nodes can, for example, be implemented as servers, an example of which is illustrated in FIG. 6(a). Therein, server 650 can contain a processor 652 (or multiple processor cores), memory 654, one or more secondary storage devices 656 and an interface unit 658 to facilitate communications between network communication node 650 and the rest of the network. Additionally, the server 650 can contain Layer 3 protocol handling software to enable it to operate as, for example, a PDSN-SAE GW 220 as described above. Mobile station or UE 214 can be implemented as a radio device such as that shown in FIG. 6(b). Therein, the device 660 includes an antenna 662, a transceiver 664 and a processor 668. The transceiver 664 will be able, according to these exemplary embodiments, to transmit and receive signals over at least two air interfaces, e.g., an LTE air interface and an HRPD air interface.

Figure 7:
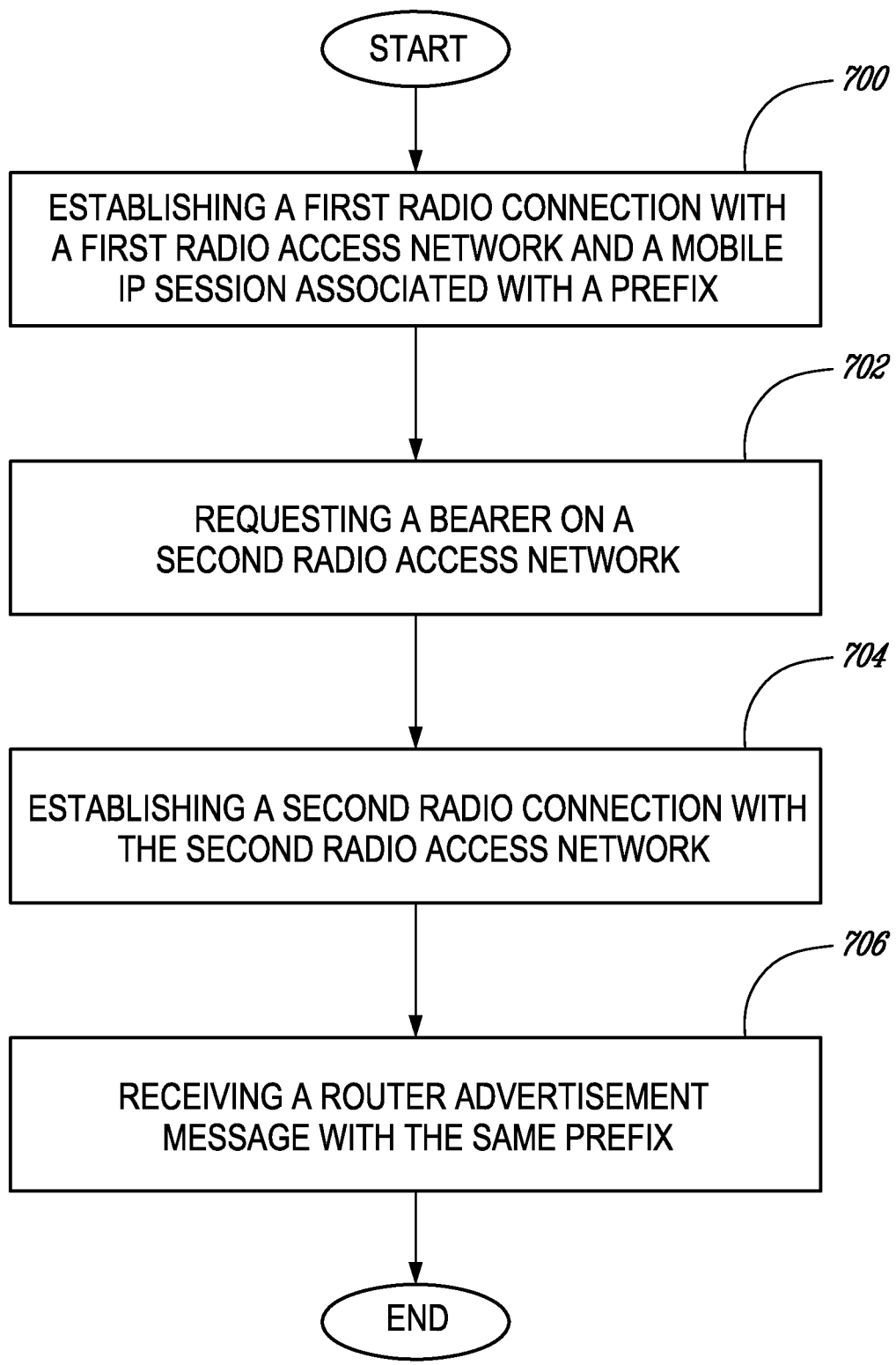
FIGS. 7 and 8 are flowcharts illustrating methods associated with exemplary embodiments.

Based on the foregoing, it will be appreciated that a method for performing a handoff according to an exemplary embodiment from a first radio access network to a second radio access network can include the steps illustrated in the flowchart of FIG. 7. Therein, at step 700, a UE 214 establishes a first radio connection with the first radio access network and a mobile IP session associated with a prefix. Then, at step 702, the UE requests a bearer on the second radio access network. A second radio connection is established by the UE 214 with the second radio access network as a result at step 704. Then, a router advertisement message which includes the same prefix is received by the UE 214 at step 706 so that the mobile IP session is maintained during the transition from the first radio connection to the second radio connection.

Figure 8:
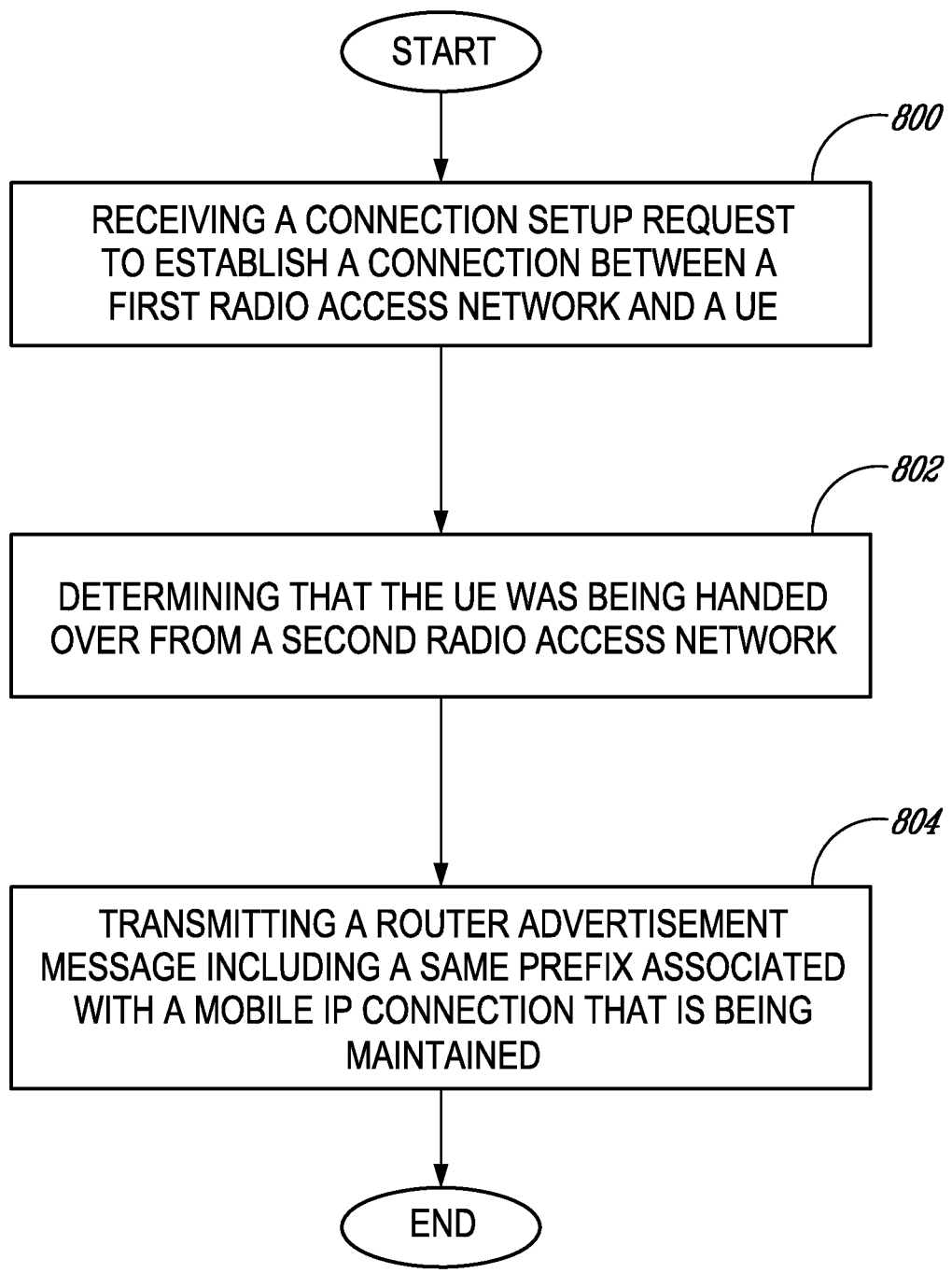

Another exemplary embodiment, illustrated in the flowchart of FIG. 8, describes a method for handing over a communication connection from a first radio access network to a second radio access network. Therein, at step 800, a connection setup request to establish a connection between a first radio access network and a user equipment (UE) is received, e.g., at a gateway node. Then, at step 802, it is determined that the UE was being handed over from a second radio access network. At step 804 a router advertisement message is transmitted toward the UE which includes a same prefix associated with a mobile IP connection that is being maintained with the UE during the handover.

Some of the foregoing exemplary embodiments are described in the context of Layer 3 signaling associated with handoffs between HRPD and LTE RANs. However, as will be appreciated by the methods depicted in the flowcharts of FIGS. 7 and 8, the present invention is not limited thereto. In fact, exemplary embodiments will find applicability to handoffs between any two access networks wherein a mobile IP session has been established and may be maintained during the transition between the two access networks.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A method of continuing a mobile IP session for a User Equipment (UE) through a handover of the UE from a first radio network to a second radio network, wherein one of the first and second radio networks is an LTE network and the other one is an HRPD network and wherein the method is implemented at a combined gateway that provides mobile IP services in both the first and second networks and comprises:

receiving a first connection request for the UE in the first radio network and correspondingly establishing the mobile IP session for the UE, said first connection request including a UE ID identifying the UE in the first radio network;

subsequently receiving a second connection request for the UE in the second radio network while the mobile IP session established in the first radio network remains at the combined gateway, said second connection request including a UE ID identifying the UE in the second radio network;

determining that the UE is handed over from the first radio network to the second radio network based on recognizing that the UE ID associated with the second connection request is the same UE ID that was associated with the first connection request;

in response to determining the UE is handed over from the radio network to the second radio network, continuing the mobile IP session for the UE in the second radio network; and indicating to the UE that the mobile IP session has been continued through the handover from the first to the second radio networks by sending a routing advertisement message to the UE in the second radio network that includes a same routing prefix as was used to identify the combined gateway to the UE in the first radio network.

2. The method of claim 1, wherein the combined gateway comprises a Packet Data Serving Node (PDSN) entity within the HRPD network and a System Architecture Evolution (SAE) Gateway (GW) in the LTE network, and wherein the method includes sharing connection request information between the PDSN entity and the SAE GW entity, for purposes of recognizing when a connection request received by either entity is associated with an existing mobile IP session as initially established with the other entity.

3. The method of claim 2, wherein continuing the mobile IP session of the UE includes transferring IP session context information for the mobile IP session from the PDSN to the SAE/GW when the handover is from the HRPD network to the LTE network, and includes transferring IP session context information for the mobile IP session from the SAE/GW to the PDSN when the handover is from the LTE network to the HRPD network.

4. The method of claim 1, further comprising providing an IP address of the combined gateway to one or more entities in the second radio access network, thereby enabling mobility management procedures in the second radio network to direct the subsequent second connection request to the combined gateway rather than to another combined gateway that otherwise might be used for establishing a new mobile IP session for the UE in the second radio network.

5. The method of claim 1, further comprising not sending a binding update to the UE for the mobile IP session as continued for the UE in the second radio network, as would otherwise be sent by the combined gateway had a new mobile IP session been established for the UE in the second radio network.

6. A gateway node configured to continue a mobile IP session for a User Equipment (UE) through a handover of the UE from a first radio network to a second radio network, wherein one of the first and second radio networks is an LTE network and the other one is an HRPD network and wherein the gateway node comprises a processor configured to:

receive a first connection request for the UE in the first radio network and to establish the mobile IP session for the UE in response to the first connection request, said first connection request including a UE ID identifying the UE in the first radio network;

subsequently receive a second connection request for the UE in the second radio network while the mobile IP session as established by the UE in the first radio network remains at the combined gateway, said second connection request including a UE ID identifying the UE in the second radio network;

determine that the UE is handed over from the first radio network to the second radio network, based on recognizing that the UE ID associated with the second connection request is the same UE ID that was associated with the first connection request;

continue the mobile IP session for the UE in the second radio network, in response to the determination that the UE is handed over from the radio network to the second radio network; and indicate to the UE that the mobile IP session has been continued through the handover from the first to the second radio networks by sending a routing advertisement message to the UE in the second radio network that includes a same routing prefix as was used to identify the combined gateway to the UE in the first radio network.

7. The combined gateway of claim 6, wherein the combined gateway comprises a Packet Data Serving Node (PDSN) entity within the HRPD network and a System Architecture Evolution (SAE) Gateway (GW) in the LTE network, and wherein the processor is configured to share connection request information between the PDSN entity and the SAE GW entity, for purposes of recognizing when a connection request received by either entity is associated with an existing mobile IP session as initially established with the other entity.

8. The combined gateway of claim 7, wherein the processor is configured to continue the mobile IP session of the UE based on transferring IP session context information for the mobile IP session from the PDSN to the SAE/GW when the handover is from the HRPD network to the LTE network, and based on transferring the IP session context information for the mobile IP session from the SAE/GW to the PDSN when the handover is from the LTE network to the HRPD network.

9. The combined gateway of claim 6, wherein the processor is configured to provide an IP address of the combined gateway to one or more entities in the second radio access network, thereby enabling mobility management procedures in the second radio network to direct the subsequent second connection request to the combined gateway rather than to another combined gateway that otherwise might be used for establishing a new mobile IP session for the UE in the second radio network.

10. The combined gateway of claim 6, wherein the processor is configured not to send a binding update to the UE for the mobile IP session as continued for the UE in the second radio network, as would otherwise be sent by the combined gateway if a new mobile IP session had been in the second radio network for the UE.

* * * * *

UNITED STATES PATENT AND TRADEMARK OFFICE
CERTIFICATE OF CORRECTION

PATENT NO. : 8,644,247 B2  
APPLICATION NO. : 11/856797  
DATED : February 4, 2014  
INVENTOR(S) : Madour et al.

Page 1 of 1

It is certified that error appears in the above-identified patent and that said Letters Patent is hereby corrected as shown below:

On the Title Page, item (73), Assignee, please change "Stockholm" to --Stockholm (SE)--.

Signed and Sealed this  
Twentieth Day of May, 2014

Michelle K. Lee  
*Deputy Director of the United States Patent and Trademark Office*